July 6, 1926.
H. S. REYNOLDS
1,591,183
JOINT BETWEEN RINGS AND SHEET METAL AND ART OF MAKING SAME
Filed March 6, 1922
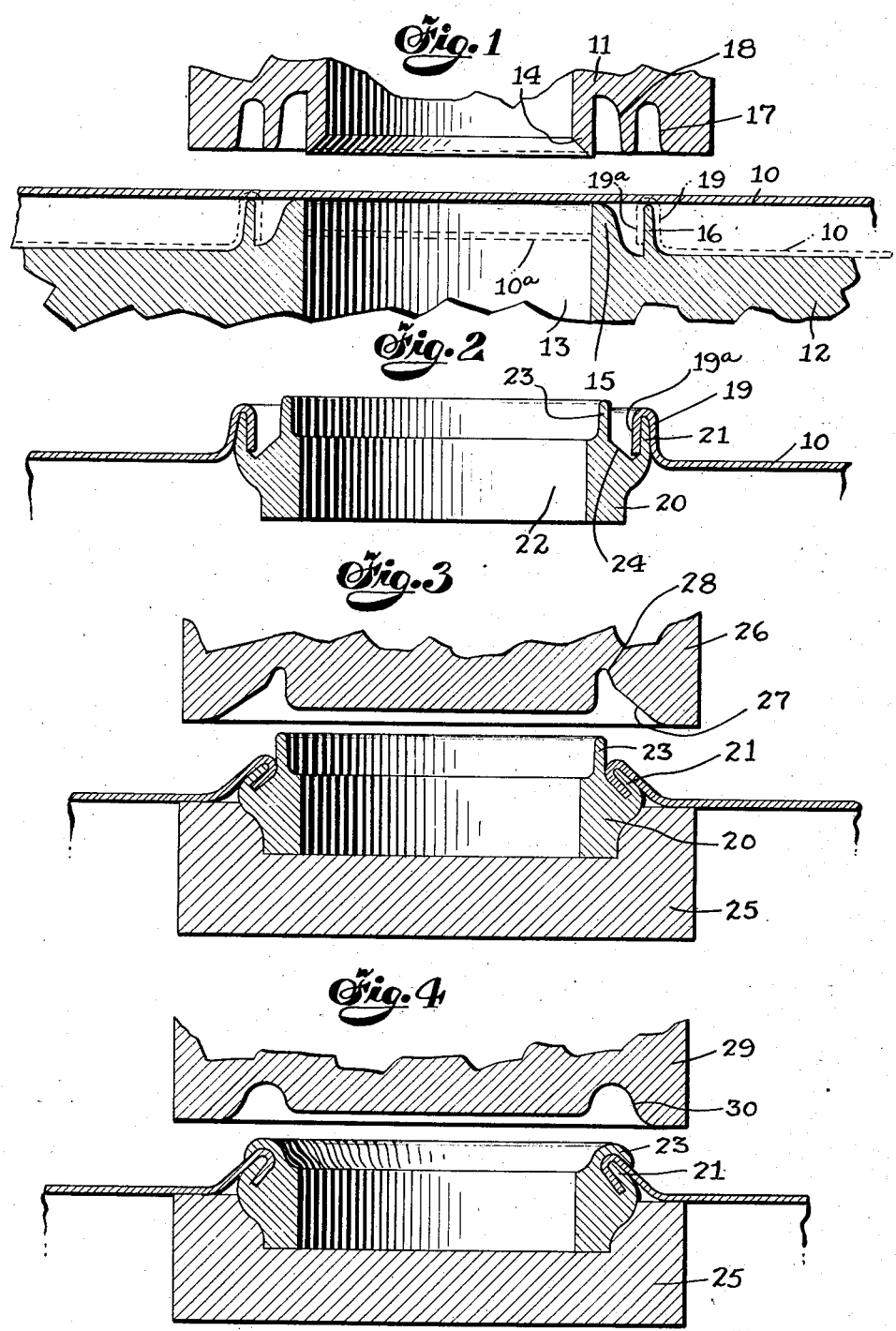

Patented July 6, 1926.

1,591,183

UNITED STATES PATENT OFFICE.

HENRY S. REYNOLDS, OF BROOKLYN, NEW YORK, ASSIGNOR TO MEURER STEEL BARREL COMPANY, INC., OF NEW YORK, N. Y., A CORPORATION OF NEW YORK.

JOINT BETWEEN RINGS AND SHEET METAL AND ART OF MAKING SAME.

Application filed March 6, 1922. Serial No. 541,302.

This invention relates to joints between rings and sheet metal and the art of making such joints, and more particularly this invention relates to a joint and the art of making a joint between a sput and the sheet metal of receptacles such as sheet metal barrels for example.

One of the objects of this invention is to provide a simple and practical method of making a durable and rugged connection between a ring member and a sheet metal. Another object is to provide a practical method of making a rigid and fluid-tight connection between the sheet metal of metallic receptacles such as barrels for example and the sput therefor. This invention aims also to provide an art of the above nature that may be readily and inexpensively carried on. Another object is to provide a construction by means of which a durable and rugged connection is made between a ring member and a sheet metal, and also to provide a practical and reliable means for connecting or attaching a sput to the sheet metal of a receptacle or container such as a barrel for example, which connection will be fluid-tight, rigid, and will meet the requirements of practical use.

The invention accordingly consists in the combination of elements, features of construction, arrangement of parts, relation and sequence of steps as will be exemplified in the art and structure to be hereinafter described and the scope of the application of which will be indicated in the following claims.

In the drawings in which is shown an embodiment of this invention,

Figure 1 is a sectional view illustrating the first step or operation on the sheet metal;

Figure 2 is a sectional view showing the ring member positioned with respect to the sheet metal member in readiness for further operations;

Figure 3 is a sectional view illustrating the ring member and sheet metal member after the succeeding stage of operation and illustrating also in section the devices for completing this operation; and Figure 4 is a sectional view illustrating the final operation upon the ring member and sheet metal member and the devices for completing this operation.

Similar reference characters refer to similar parts throughout the several views of the drawings.

As conducive to a clearer understanding of this invention it may at this point be briefly stated that in attaching or securing ring members to sheet metal members, for example as in securing a sput to the sheet metal of receptacles such as barrels, containers and the like, it is necessary that the joint made therebetween be not only mechanically rigid so as to prevent a relative turning between the parts, but also fluid-tight. Thus where in the case of sheet metal barrels and the like the opening in the ring member or sput provided for the passage of fluids therethrough is closed by means of a threaded plug or the like, the ring member or sput is subjected to relatively large forces or stresses tending to rotate the ring member or sput with respect to the sheet metal when the plug is screwed into position or is removed. This invention aims particularly to provide a simple and practical joint and a method of making the same which will be both mechanically rigid and fluid-tight. Accordingly, the invention will be described in connection with the making of a joint of the above nature between the sput and the sheet metal member of a metallic barrel, container or the like.

Referring now to the drawings, and more particularly to Fig. 1, there is shown at 10 a sheet metal member to which it is desired to secure a ring member or a sput. In Fig. 1 the sheet metal member 10 is shown positioned with respect to a punch member 11 and a die member 12. The die member 12 is provided with a die-hole 13 with which the punch 14 of the punch member 11 is adapted to coact, the parts being preferably circular so that when the punch member 11 and the die member 12 are moved relatively to one another, the punch 14 will enter the die-hole 13 and will punch a circular opening in the sheet metal member 10. Thus at 10ª is shown in dotted lines the blank which the punch 14 stamps out of the sheet metal member 10 to form a circular opening therein.

Arranged concentrically with respect to the wall-forming portion 15 in which the die-hole 13 is formed is a substantially upstanding flange 16 preferably formed integrally with the die member 12 and having its upper edge portions in a plane preferably slightly below the plane of the upper edge portions of the die-hole 13. Turning now to the punch member 11, it will be noted that extending about the punch 14 therein and substantially concentric therewith is a recess or annular groove 17 adapted to coact with the flange 16 of the die member 12 and dimensioned so that the flange 16 may be received therein and with the sheet metal of the member 10 therebetween. The punch member 11 is furthermore grooved concentrically with the punch 14 as at 18 so that upon the punching operation taking place, the portions 15 of the die member 12 within which the die-hole 13 is formed may be received within the punch member 11 so as to permit the desired relative movement to take place.

The parts of the punch member 11 above described are preferably so proportioned with respect to the die member 12 that the punch 14 is effective, as already above noted, to stamp out the blank 10ª in the sheet metal member 10 to form a circular opening therein. Upon continued relative movement of the punch member and the die member the portions of the sheet metal member 10 adjacent to and surrounding the opening thus punched therein are engaged by the flange 16 on the die member 12 and the remaining portions of the punch member 11; and the flange 16 upon entering the annular groove 17 in the punch member 11 forms the portions of the sheet metal member 10 adjacent the opening into a securing flange 19 preferably substantially hook-shaped and having an overlapping rim-like portion thus bent substantially transversely of the sheet metal member 10 and about the opening, as at 19ª.

Having thus formed the securing flange extending about the periphery of the opening in the sheet metal member 10, a ring member or sput 20 (see Fig. 2) having a substantially upstanding flange 21 extending preferably about its periphery is positioned with respect to the sheet metal member 10 so that the flange 21 is engaged by and substantially within the hook-shaped flange 19 formed as above described. And as will be seen in Figure 2 such inter-egagement of the sheet metal member 10 with the ring member or sput 20 brings the rim-like portion 19ª, which is about the opening in the sheet metal member 10, into the space or groove between the inner wall of the flange 21 and the downwardly and outwardly inclined (see Fig. 2) wall or shoulder 24 of the sput 20. The ring member 20, furthermore, has the usual opening indicated at 22 into which may be secured in any desired manner a plug, for example, for closing the opening where the ring member 20 is desired to be used as a sput in connection with a fluid receptacle or container. The sput 20 has a second flange 23 substantially concentric with the flange 21 and of smaller diameter than the flange 21 so as to be positioned within the latter flange. Intervening the concentric flanges 21 and 23 is a shoulder-forming portion 24 preferably inclined as shown in Fig. 2 and of sufficient extent to accommodate the overlapping portion 19ª of the hook-shaped flange 19 when the latter, together with the outer flange 21, is bent inwardly as will hereinafter be described. Furthermore, the parts of the punch member 11 and the die member 12 above described are preferably so dimensioned with respect to one another that the overlapping portion 19ª formed in the hook-shaped flange 19 of the sheet metal member 10 during the first operation above described is of sufficient extent to be accommodated between the concentric flanges 21 and 23 of the sput 20 when the former flange is bent inwardly.

Having thus preliminarily positioned the sput 20 with respect to the sheet metal member 10 so that the flange 21 is engaged by the securing flange on the sheet metal member 10, the parts so positioned are thereupon placed in a holding die 25 suitably formed to rigidly position the sput 20 with its associated sheet metal member 10 with respect to a punch 26 formed substantially as shown in Fig. 3. The punch 26, it will be noted, is provided with an inwardly sloping operating surface 27 terminating at its innermost parts in a recess 28. Thus when the punch 26 is moved relatively to the holding die 25, the inwardly sloping surface 27 of the punch 26 engages the engaged flanges 19 and 21 (up to now in the position shown in Fig. 2) and upon continued relative movement bends the flanges 19 and 21 inwardly with respect to the ring member and into the position substantially as shown in Fig. 3. During this operation the inner flange 23 of the ring member or sput 20 is housed within the annular groove or recess 28 in the punch 26 and is substantially unaffected by this pressing operation. The action of the punch 26 gives the parts a relation, as above noted, like that shown in Figure 3, from which it will be seen that the rim-like portion 19ª of the sheet metal member 10 has been forced and laid against the downwardly and outwardly inclined wall or shoulder-forming portion 24 and has been made to conform itself substantially to the shape and inclination of the latter, while the flange 21 has been bent inwardly so that the rim-like portion 19ª is securely clamped between the main body portion or the shoulder-forming portion 24 of the sput 20 and the flange 21 itself. During this operation it will be noted that the free edge of the hook-shaped securing flange 19, that is, the lower edge of the rim-like portion 19ª, is entirely bottomed against the base of the outer flange 21 and that the outer edge portion of the flange 21 securely pinches the securing flange between itself and the base of the inner flange 23 on the sput 20. The parts are thus not only securely and rigidly interlocked, but the available coacting surfaces of contact are made a maximum so that the frictional holding of the parts in position is likewise a maximum.

With the parts thus formed as is shown in Fig. 3, another punch 29 as shown in Fig. 4 is made operative to coact with the holding die 25. The punch 29 is provided with an annular groove 30, the walls of which are so curved and formed that upon the punch 29 and the holding die 25 being moved toward one another, the inner flange 23 on the sput 20 is forced and bent outwardly with respect to the ring member so as to overlap the inwardly bent and interlocked flanges 19 and 21 of the sheet metal member 10 and the sput 20 respectively. Preferably the flange 23 is of sufficient extent to extend a substantial distance over the inwardly bent flange 21 and it thus not only securely pinches the hook-shaped securing flange 19 between the upper edge portions of the flange 21 and itself, but also securely clamps the securing flange 19 between itself and the inwardly bent flange 21 throughout a material area so as to increase the frictional holding together between the several parts. Furthermore, the flange 23 in being thus made to overlap the inwardly bent or interlocked flanges 19 and 21 adds to the clamping action of the flange 21 and securely locks the inwardly bent flanges in interlocked relation. The rim-like portion 19ª will also be seen to be effectively prevented from partaking of any retrograde movement out of the groove or space between the inclined shoulder or wall 24 and the inner and similarly inclined wall of the flange 21, not only because of the action of the overlapping flange 23, but also (and independently of the flange 23) by reason of the downward and outward inclination of the walls of the groove and the like inclination given the rim 19ª seated and clamped therein.

It may be noted that during the punching operation in which the several engaged flanges are bent, sufficient force may be applied to the punches to cause an actual flowing together of the material of the securing flange 19 on the sheet metal member 10 and the flanges 21 and 23 on the sput 20. The ring member 20 and the sheet metal member 10 are thus not only in rigid mechanical connection effective to prevent a relative turning to take place between the parts and effective also to withstand the conditions of hard, practical use, but also form a connection or joint which is fluid-tight. The several parts are securely clamped together and, particularly where the actual flowing together of the metal takes place where sufficient pressures are employed, the resultant joint is one of great mechanical rigidity and strength.

It will thus be noted that there has been provided in this invention a joint between ring members and sheet metal members and a method of making the same in which the several objects hereinbefore set forth are achieved and in which many advantages are attained. It will be noted that the joint thus formed is of simple construction, is fluid-tight, and, moreover, is well adapted to meet the requirements of practical use; furthermore, it should be noted that the method provided by this invention is of marked simplicity and may be readily and inexpensively carried on.

As many possible embodiments might be made of this invention and as many changes might be made in the embodiment above set forth or in the steps hereinbefore set forth, it is to be understood that all matter hereinbefore described or set forth in the accompanying drawings is to be interpreted as illustrative and not in a limiting sense.

I claim as my invention:

1. The herein described art of forming a connection between rings and sheet metal, which consists in forming a metal ring member having in its upper annular surface a downwardly extending annular groove at least one of the walls of which is inclined downwardly and outwardly, forming in a sheet metal member an opening and about said opening a depending rim shaped substantially to enter the open end of said groove, inter-engaging said ring member and said sheet metal member by moving the rim of the latter into the groove of the former, and forcing those portions of the metal of said ring that are opposite the inclined wall of said groove against said rim to clamp the latter against said inclined wall.

2. The herein described art of forming a connection between rings and sheet metal, which consists in forming a metal ring having in its upper annular surface an annular groove the inner wall of which is inclined outwardly toward its base, forming in a sheet metal member an opening and about said opening a depending rim, forcing said rim downwardly edgewise into said groove, and forcing the outer wall of said groove inwardly and downwardly to clamp said rim between the same and said inclined inner wall.

3. The herein described art of forming a connection between rings and sheet metal, which consists in forming a metal ring having in its upper annular surface an annular groove the inner wall of which is inclined outwardly toward its base, forming in a sheet metal member an opening and about said opening a depending rim, inter-engaging said ring member and said sheet metal member by moving the rim of the latter downwardly edgewise into said groove, forcing the outer wall of said groove inwardly and downwardly to clamp said rim between the same and said inclined inner wall, and forcing the sheet metal surrounding said rim downwardly and inwardly against the outer surface of said inwardly and downwardly forced portion of the ring.

4. The herein described art of forming a connection between rings and sheet metal, which consists in forming a metal ring member having on its upper annular surface a peripheral upstanding flange and interior of said flange an annular surface sloping upwardly and inwardly from adjacent the base thereof, forming in a sheet metal member an opening of smaller diameter than said flange and about said opening a depending rim, and interlocking said ring member and said sheet metal member by first moving said rim downwardly edgewise within said upstanding flange and then forcing said flange and said rim therewith inwardly toward said inclined surface to clamp said rim against said inclined surface.

5. The herein described art of forming a connection between rings and sheet metal, which consists in forming a metal ring having in its upper annular surface an annular groove the inner wall of which is inclined outwardly toward its base, forming in a sheet metal member an opening and about said opening a depending rim, interengaging said ring member and said sheet metal member by moving said rim downwardly edgewise into said groove, forcing the outer wall of said groove inwardly and downwardly to clamp said rim between the same and said inclined inner wall, and then forcing the upper portion of the part of said ring member on the inner side of said groove outwardly over a portion of the sheet metal surrounding said rim.

6. The herein described art of forming a connection between rings and sheet metal, which consists in forming a metal ring member having on its upper annular surface a pair of annular substantially concentric upstanding flanges, forming in a sheet metal member an opening and about said opening a depending rim, placing said rim between said two flanges, bending the outer flange inwardly and downwardly to clamp said rim, and bending the inner flange outwardly and downwardly over a portion of the sheet metal surrounding said clamped rim.

7. The herein described art of forming a connection between rings and sheet metal, which consists in forming a metal ring member having on its upper annular surface a pair of annular substantially concentric upstanding flanges and between said flanges a downwardly and outwardly inclined annular surface, forming in a sheet metal member an opening and about said opening a depending rim, placing said rim between said two flanges, bending the outer flange inwardly and downwardly to clamp said rim against said inclined surface, and bending the inner flange outwardly and downwardly over a portion of the sheet metal surrounding said clamped rim.

8. In a construction of the class described, in combination, a metal ring member having therein an annular groove the walls of which are inclined at an acute angle with respect to the axis of the ring, and a sheet metal member having an opening therein and a rim about said opening shaped substantially to the contour of said groove, resting therein and locked between the walls thereof, the sheet metal about said rim being bent over the portion of said ring exterior of said groove.

9. In a construction of the class described, in combination, a metal ring having therein a downwardly extending annular groove the walls of which are inclined from its mouth downwardly at an angle with respect to the axis of the ring, and a sheet metal member having an opening therein and a rim about said opening shaped substantially to the contour of said groove, resting therein and locked between the walls thereof.

10. In a construction of the class described, in combination, a metal ring having therein a downwardly extending annular groove the walls of which are inclined downwardly and outwardly from its mouth toward its base at an angle with respect to the axis of the ring, and a sheet metal member having an opening therein and a rim about said opening shaped substantially to the contour of said groove, resting therein and locked between the walls thereof.

11. In a construction of the class described, in combination, a metal ring member having in its upper portion an annular downwardly extending groove inclined outwardly toward its base, the outer wall of said groove comprising an annular flange forming the outer portion of said ring exterior of said groove, and a sheet metal member having an opening therein and a downwardly and outwardly inclined rim about said opening and resting in said groove, said flange locking said rim between the walls of said groove.

12. In a construction of the class described, in combination, a metal ring member having in its upper portion an annular downwardly extending groove inclined outwardly toward its base, the outer wall of said groove comprising an annular flange forming the outer portion of said ring exterior of said groove, and a sheet metal member having an opening therein and a downwardly and outwardly inclined rim about said opening, resting in said groove and locked between the walls thereof, the sheet metal surrounding said rim being bent over the upper end of said flange and downwardly over the outer surface thereof.

13. In a construction of the class described, in combination, a metal ring member, and a sheet metal member having therein an opening and portions about said opening bent out of the plane of said sheet metal and interlocked with the metal of said ring, said portions extending in a direction downwardly and outwardly inclined at an angle with respect to the axis of the ring.

14. In a construction of the class described, in combination, a metal ring member having in its upper portion an annular downwardly extending groove inclined outwardly toward its base, the outer wall of said groove comprising an annular flange forming the outer portion of said ring exterior of said groove, a sheet metal member having an opening therein and a downwardly and outwardly inclined rim about said opening, resting in said groove and locked between the walls thereof, the sheet metal surrounding said flange being bent over the upper end of said outer flange, said ring having portions thereof inside of said groove bent outwardly against said sheet metal member and in a direction substantially transverse of the rim of the latter.

15. In a construction of the class described, in combination, a metal ring member having in its upper portion an annular downwardly extending groove inclined outwardly toward its base, the outer wall of said groove comprising an annular flange forming the outer portion of said ring exterior of said groove, a sheet metal member having an opening therein and a downwardly and outwardly inclined rim about said opening, resting in said groove and locked between the walls thereof, the sheet metal surrounding said rim being bent over the upper end of said flange and downwardly over the outer surface thereof, and the upper portion of said ring inside of said groove being flanged outwardly and downwardly over said last portion of the sheet metal.

In testimony whereof, I have signed my name to this specification this 27th day of February, 1922.

HENRY S. REYNOLDS.